(12) United States Patent
Tauschinsky et al.

(10) Patent No.: US 11,579,588 B2
(45) Date of Patent: Feb. 14, 2023

(54) MULTIVARIATE NONLINEAR AUTOREGRESSION FOR OUTLIER DETECTION

(71) Applicant: SAP SE, Walldorf (DE)

(72) Inventors: Atreju Florian Tauschinsky, Walldorf (DE); Stefan Kain, Rauenberg (DE); Robert Meusel, Mannheim (DE)

(73) Assignee: SAP SE, Walldorf (DE)

(*) Notice: Subject to any disclaimer, the term of this patent is extended or adjusted under 35 U.S.C. 154(b) by 1234 days.

(21) Appl. No.: 16/049,287

(22) Filed: Jul. 30, 2018

(65) Prior Publication Data

US 2020/0033831 A1    Jan. 30, 2020

(51) Int. Cl.
   *G05B 19/4063*    (2006.01)
   *G06N 3/08*    (2023.01)

(52) U.S. Cl.
   CPC ........... *G05B 19/4063* (2013.01); *G06N 3/08* (2013.01); *G05B 2219/32234* (2013.01)

(58) Field of Classification Search
   CPC .......................................... G05B 2219/32234
   See application file for complete search history.

(56) References Cited

U.S. PATENT DOCUMENTS

| | | | |
|---|---|---|---|
| 8,660,868 B2 | 2/2014 | Vogel et al. | |
| 2010/0023307 A1* | 1/2010 | Lee .................... | G05B 23/0254 703/7 |
| 2013/0079938 A1 | 3/2013 | Lee et al. | |
| 2015/0316907 A1* | 11/2015 | Elbsat .................... | G06Q 10/06 700/275 |
| 2017/0016430 A1* | 1/2017 | Swaminathan ........ | G06Q 50/06 |
| 2017/0208081 A1* | 7/2017 | Mukherjee .............. | G06F 17/18 |
| 2020/0203017 A1* | 6/2020 | Dower ................... | G16H 50/20 |

OTHER PUBLICATIONS

U.S. Appl. No. 15/463,601, Meusel et al., filed Mar. 20, 2017.
U.S. Appl. No. 62/459,197, Meusel et al., filed Feb. 15, 2017.

* cited by examiner

*Primary Examiner* — Nathan L Laughlin
(74) *Attorney, Agent, or Firm* — Fish & Richardson P.C.

(57) ABSTRACT

Methods, systems, and computer-readable storage media for receiving a time-series of data values associated with a plurality of sensors, each sensor generating at least a portion of the time-series of a respective data value, providing a plurality of auto-regression models, each auto-regression model being provided based on a respective first sub-set of the time-series of data values used as input, and a respective second sub-set of the time-series of data values used as training data during a training process, receiving respective data values associated with a time from and generated by each of the plurality of sensors, determining respective predicted values for each of the auto-regression models, and selectively indicating that an anomaly is present in the system based on respective predicted values for each of the auto-regression models, and the respective data values associated with a time.

20 Claims, 4 Drawing Sheets

MULTIVARIATE NONLINEAR AUTOREGRESSION FOR OUTLIER DETECTION

BACKGROUND

Within the area of IoT (Internet of Things), and particularly in predictive maintenance, a goal can include detecting potential failure of machines, components. Predicting failure is based on observations (sensor data) occurring before the failure critically affects the whole machine, and causes a breakdown. Accordingly, models are needed to detect behavior patterns of sensor values, which caused errors, and/or malfunction of a machine in the past. In many cases, no or only minimal training data is available. Consequently, standard classification algorithms are impractical.

SUMMARY

Implementations of the present disclosure are directed to detecting anomalies based on time-series sensor data. More particularly, implementations of the present disclosure are directed to detecting anomalies based on time-series data using multiple auto-regression models.

In some implementations, actions include receiving a time-series of data values associated with a plurality of sensors, each sensor generating at least a portion of the time-series of a respective data value, providing a plurality of auto-regression models, each auto-regression model being provided based on a respective first sub-set of the time-series of data values used as input, and a respective second sub-set of the time-series of data values used as training data during a training process, receiving respective data values associated with a time from and generated by each of the plurality of sensors, determining respective predicted values for each of the auto-regression models, and selectively indicating that an anomaly is present in the system based on respective predicted values for each of the auto-regression models, and the respective data values associated with a time. Other implementations of this aspect include corresponding systems, apparatus, and computer programs, configured to perform the actions of the methods, encoded on computer storage devices.

These and other implementations can each optionally include one or more of the following features: each auto-regression model is provided by processing the respective first sub-set of the time-series of data values used as input, and a respective second sub-set of the time-series of data values used as training data through a neural network during the training process; the neural network includes one of a long short-term memory (LSTM), recurrent neural network (RNN), and a gated recurrent unit (GRU) RNN; a size of the time-series data used to train each of the plurality of auto-regression models is determined based on a size of the neural network; data values of the time-series data are provided from input data that is pre-processed, and normalized; selectively indicating that an anomaly is present in the system includes: determining a final anomaly score based on respective predicted values for each of the auto-regression models, and the respective data values associated with a time, and indicating that an anomaly is present in response to determining that the final anomaly score exceeds a threshold anomaly score; and the final anomaly score is determined based on anomaly scores determined for each of the auto-regression models.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
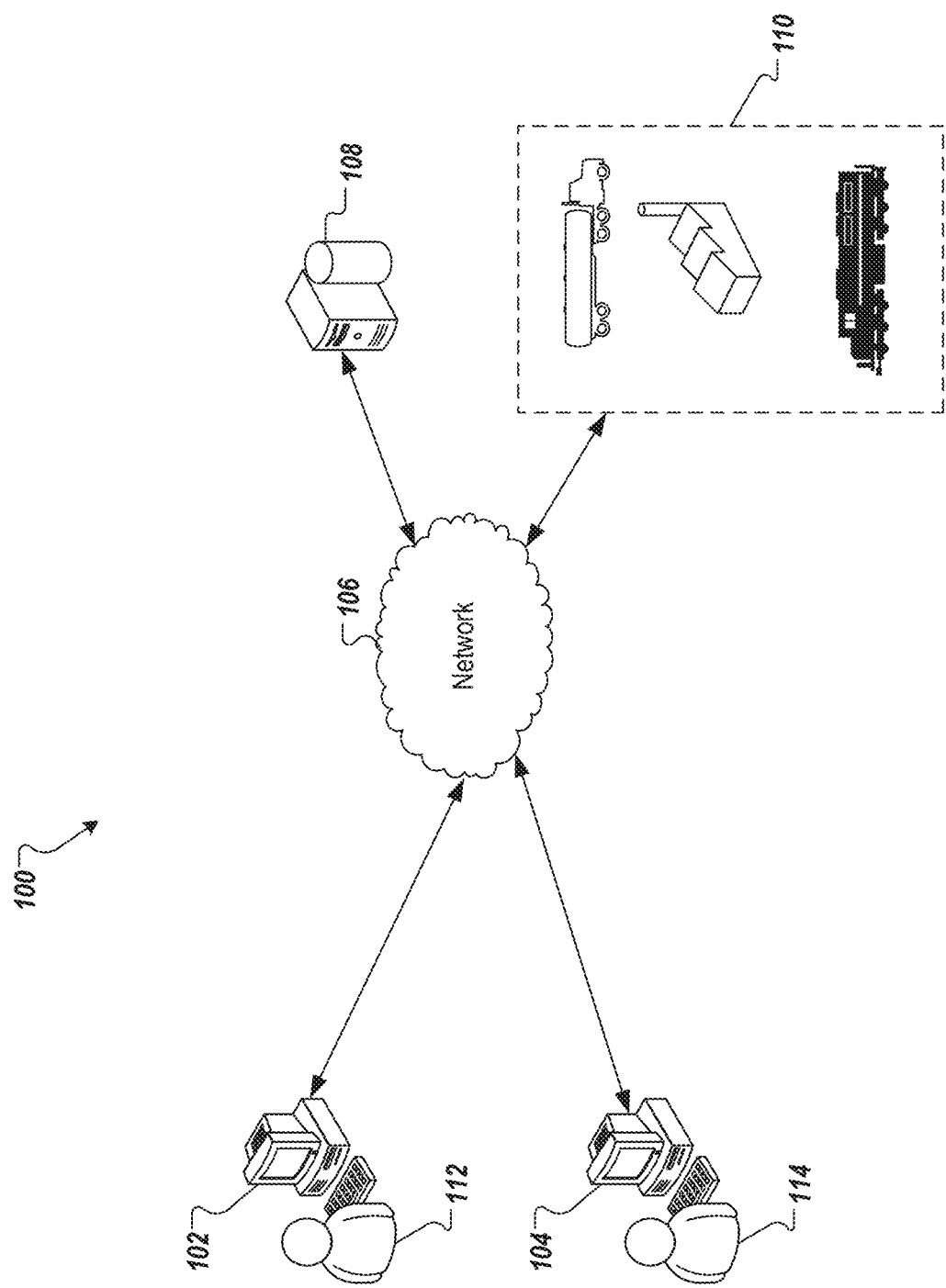
FIG. 1 depicts an example architecture that can be used to execute implementations of the present disclosure.

Implementations of the present disclosure are directed to detecting anomalies based on time-series sensor data. More particularly, implementations of the present disclosure are directed to detecting anomalies based on time-series data using multiple auto-regression models. Implementations can include actions of receiving a time-series of data values associated with a plurality of sensors, each sensor generating at least a portion of the time-series of a respective data value, providing a plurality of auto-regression models, each auto-regression model being provided based on a respective first sub-set of the time-series of data values used as input, and a respective second sub-set of the time-series of data values used as training data during a training process, receiving respective data values associated with a time from and generated by each of the plurality of sensors, determining respective predicted values for each of the auto-regression models, and selectively indicating that an anomaly is present in the system based on respective predicted values for each of the auto-regression models, and the respective data values associated with a time.

Implementations of the present disclosure build on subject matter disclosed in U.S. application Ser. No. 15/463,601, filed on Mar. 20, 2017, and claims priority to U.S. App. No. 62/459,197, filed on Feb. 15, 2017, the contents of these applications are hereby incorporated by reference in their entireties for all purposes.

Implementations of the present disclosure are described in further detail herein with reference to an example context of data analytics for predictive maintenance. This can be generally referred to as predictive maintenance and services (PdMS). An example PdMS includes the PdMS System provided by SAP SE of Walldorf, Germany. In some examples, data is processed using data analytics to provide maintenance data on one or more devices, and/or to perform tasks associated with assets (e.g., issuing maintenance tickets). It is contemplated, however, that implementations of the present disclosure can be applied in an appropriate context.

As introduced above, within the area of IoT (Internet of Things), and particularly in predictive maintenance, a goal can include detecting potential failure of machines, components, and the like. Predicting failure is based on observations (sensor data) occurring before the failure critically affects the whole machine, and causes a breakdown. Accordingly, models are needed to detect behavior patterns of sensor values, which caused errors, and/or malfunction of a machine in the past. In many cases, no or only minimal training data is available, which can be referred to as a cold-start problem. Consequently, standard classification algorithms are impractical.

Predictive maintenance systems should be able to detect anomalies. An example anomaly can include, without limitation, a component being in an unexpected state (e.g., abnormal speed, temperature, and/or noise). An anomaly can indicate potential failure of one or more components. Generally, anomaly detection is performed by identifying anomalous patterns in historical sensor data, which preceded past failures, and comparing current sensor data to the historical patterns. However, there are multiple problems with these techniques. One problem is that not all anomalies that lead to a failure may have been seen in the historical data. In other words, the historical data does not account for previously unseen anomalies. Another problem is that little to no historical data may be provided for a particular system (e.g., the cold start problem).

In view of this, and as described in further detail herein, implementations of the present disclosure enable the detection of anomalies (abnormal behavior) without, or with sparse training data. Implementations of the present disclosure also cope with time-series data provided from multiple sensors. More particularly, implementations of the present disclosure determine one or more predicted data values using one or more nonlinear auto-regression models. In some examples, each nonlinear auto-regression model takes previous values of the sensors into account, and fits a nonlinear auto-regression implemented by a neural network to provide a predicted value for one or more sensors. The predicted data values are compared to observed data values. In some implementations, an anomaly score is provided, and indicates a degree to which an observed value indicates an anomaly. In some examples, the anomaly score is an aggregate anomaly score based on respective anomaly scores determined for each of the nonlinear auto-regression model.

FIG. 1 depicts an example architecture 100 in accordance with implementations of the present disclosure. In the depicted example, the example architecture 100 includes one or more client devices 102, 104, a network 106, a server system 108, and assets 110. The server system 108 includes one or more server devices and databases (e.g., processors, memory). In the depicted example, respective users 112, 114 interact with the client devices 102, 104. In an example context, the users 112, 114 can include users (e.g., enterprise operators, maintenance agents), who interact with one or more a data analytics system hosted by the server system 108.

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

In accordance with the example context, the assets 110 can include entities, for which predictive maintenance is to be conducted. Example assets can include, without limitation, cars, trucks, trains, planes, boats, ships, buildings, factories, or components thereof (e.g., engine, motor, compressor, HVAC unit, etc.). In some examples, an asset can include one or more sub-assets (sub-components). The terms asset and sub-asset are used inter-changeably herein. In general, an asset (and sub-asset) can include any appropriate entity, for which data can be provided, and data analytics can be performed. In some examples, data associated with each asset 110 is provided to the server system 108 over the network 106, which data is processed by an anomaly detection system, as described in further detail herein.

In some implementations, data values provided by sensors associated with the assets 110 are transmitted to the server system 108 for processing in accordance with implementations of the present disclosure. In some examples, the data values are transmitted in real-time, as each data value is generated. In some examples, the data values are transmitted in periodic batches. In some examples, each data value is associated with a respective timestamp indicating a time, at which the data value was generated. Accordingly, the data values can be described as time-series data.

In some implementations, data includes information technology (IT) data, and operational technology (OT) data. In some examples, IT data includes data provided from one or more enterprise systems. For example, an enterprise system can include an inventory of assets managed by a respective enterprise, the inventory recording assets by respective identifiers (unique identifiers), and other relevant information (e.g., description, part number, location, identifiers of sub-assets of the asset). In some examples, IT data is stored in a data store (e.g., of the server system 108), and can be retrieved based on identifiers associated with assets. For example, a database can be queried based on an asset identifier, and IT data associated with the respective asset can be provided in response to the query.

In some examples, OT data includes data provided from one or more sensors. Example sensors can include sensors integrated into an asset (e.g., environmental (pressure, temperature) sensors, speed (RPM) sensors, fluid (oil, coolant) level sensors. Example sensors can include sensors that are independent of an asset, but that monitor data associated with the asset (e.g., video cameras, environmental (pressure, temperature) sensors, motion sensors). For example, sensors can be included in a networked device that is proximate to an asset, and that provides data relevant to the asset. In some examples, OT data is stored in a data store (e.g., of the server system 108), and can be retrieved based on identifiers associated with assets, and/or identifiers assigned to sensors, and/or devices associated with assets. In some examples, devices associated with assets can include so-called Internet-of-things (IoT) devices. For example, a video camera monitors a particular asset and includes an identifier. An identifier of the video camera can be correlated to an identifier of the asset, and recorded in the enterprise system. Data provided by the video camera (e.g., video, images) can be stored in a database based on the identifier of the video camera and/or the identifier of the asset. The data can be queried based on the asset identifier and/or the video camera identifier, and OT data associated with the respective asset can be provided in response to the query.

As introduced above, and in accordance with the example context, the area of IoT condition monitoring, and predictive maintenance includes the prediction of upcoming expected, and/or unexpected maintenance-relevant events. In general, the objects of predictive analytics can include relatively complex assets (e.g., a compressor, a train, a power plant). Assets can range from granular-level devices to systems made up of multiple (e.g., tens, hundreds, thousands) of devices. For example, an asset can be a compound of several sub-assets, which possibly are again compounds of other sub-assets. In the predictive maintenance context, and as introduced above, assets can be equipped with sensors, which are responsive to environment and/or activity, and capture data values.

In some implementations, data is received from multiple sensors, and is processed to detect whether an anomaly is present. In some examples, the data represents a state of an asset of interest in terms of monitored parameters. By way of non-limiting example, a turbine can be considered, and data representative of a state of the turbine can include rotational speed, output (e.g., power, torque), and bearing temperature. In some examples, data that represents a state of an asset can be related (e.g., dependent on one another). Continuing with the non-limiting example of a turbine, rotational speed, and bearing temperature can be related (e.g., bearing temperature increases/decreases based on respective increase/decrease of rotational speed, and/or respective increase/decrease of output). In some examples, a data value of a sensor for a given time (t) depends on values of one or more sensors at another time (t±x; where x>0). An example is the ambient temperature curve during a day. The one or more sensors can be other sensors, or the same sensor that provides the data value at time t.

Figure 2:
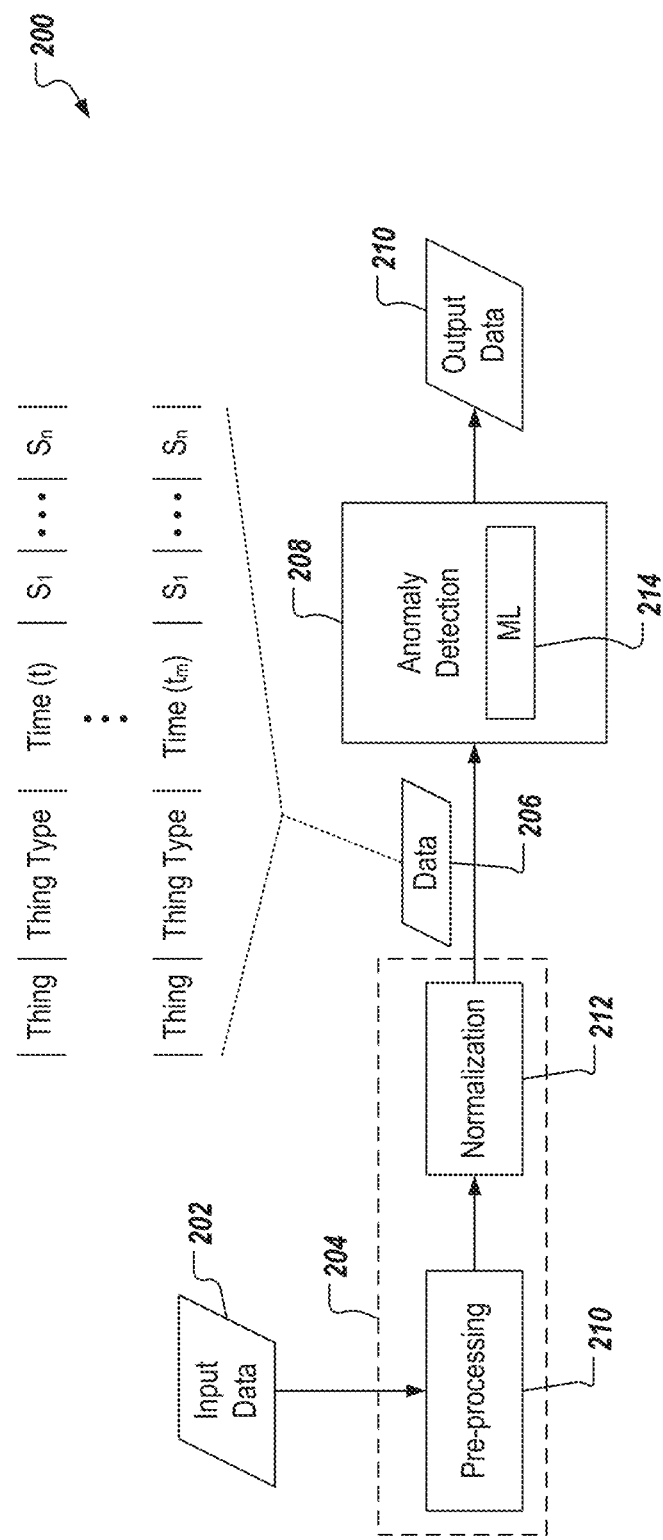
FIG. 2 depicts a conceptual architecture in accordance with implementations of the present disclosure.

FIG. 2 depicts a conceptual architecture 200 in accordance with implementations of the present disclosure. The example conceptual architecture 200 will be referenced in further describing implementations of the present disclosure. In the depicted example, input data 202 is provided to a pre-processing component 204, which provides pre-processed data 206 to an anomaly detection component 208. The anomaly detection component 208 provides output data 210. In some examples, the output data 210 includes an indication of whether an anomaly is present, and/or a likelihood of an anomaly being present. For example, the output data 210 can indicate whether a data value of a particular sensor at time (t) is anomalous, and/or a likelihood that the data value of the particular sensor at time (t) is anomalous.

In the example of FIG. 2, the pre-processing component includes a pre-processing sub-component 210, and a normalization sub-component 212. In some examples, the pre-processing sub-component 210 pre-processes the input data 202, which is provided as time-series data at respective timestamps. In some examples, the data values recorded in the input data 202 are not equidistant in terms of time. In some examples, the pre-processing sub-component to ensure the data values are equidistant in terms of time. For example, a first sensor can sample data at a first sampling rate (e.g., seconds), and a second sensor can sample data at a second sampling rate (e.g., half-seconds). Consequently, example input data 202 can be provided as:

TABLE 1

| Example Input Data | | |
|---|---|---|
| Timestamp | Sensor 1 ($S_1$) | Sensor 2 ($S_2$) |
| $t_1$ | $X_{1,1}$ | $X_{2,1}$ |
| $t_2$ | | $X_{2,2}$ |
| $t_3$ | $X_{1,3}$ | $X_{2,3}$ |
| $t_4$ | | $X_{2,4}$ | where $t_1$ and $t_3$ are whole seconds (e.g., 1, 2), and $t_2$ and $t_4$ are half seconds (e.g., 1.5, 2.5). It is contemplated that the increments of the above example are themselves examples, and that any appropriate sampling rate can be used (e.g., hours, minutes, seconds, milliseconds, nanoseconds). In the example of Table 1, the data values are not equidistant, because data values are missing for $S_1$ at times $t_2$, and $t_4$ due to the less frequent sampling rate of $S_1$.

In some implementations, data values are up-sampled, and/or down-sampled by the pre-processing sub-component. In some examples, up-sampling can include generating data values between actual data values. For example, a data value can be generated for $S_1$ at times $t_2$ (e.g., interpolating between $X_{1,1}$ and $X_{1,3}$), and $t_4$. In some examples, downsampling can include removing actual data values. For example, the data values $X_{2,2}$ and $X_{2,4}$ can be removed for $S_2$.

In some examples, the input data is provided in one or more units of measurement (e.g., RPM, farads, volts). Accordingly, the normalization sub-component 212 normalizes the data values, such that all data values are within a predefined range (e.g., [0, 1], [−1, 1]). That is, the data values are normalized, such that respective units are dropped. In some examples, normalization can be executed based on statistics of the data values (e.g., subtracting a mean of the data values from a data value, and dividing by a standard deviation of the data values; subtracting a minimum of the data values from a data value, and dividing by a difference between a maximum of the data values and the minimum).

In the example of FIG. 2, the anomaly detection component 208 includes a machine learning (ML) sub-component 214. In some examples, the ML sub-component 214 processes at least a portion of the data (e.g., the prep-processed data 206) to provide the output data 210. In some examples, the ML sub-component 214 includes a neural network. An example neural network can include, without limitation, a recurrent neural network (RNN). An example RNN includes a long short-term memory (LSTM) RNN. In some examples, LSTM units (or blocks) are a building unit for layers of the RNN. An LSTM unit can include, without limitation, a cell (e.g., for "remembering" values), an input gate, an output gate, and a forget gate. Each of the gates can be described as an artificial neuron that computes an activation (e.g., using an activation function) of a weighted sum. Although implementations of the present disclosure are described in further detail herein with reference to the LSTM RNN, it is contemplated that the ML sub-component 214 can include any appropriate ML mechanism (e.g., a gated recurrent unit (GRU) RNN) for providing the output data 210.

In accordance with implementations of the present disclosure, sets of data values are received. For example, and with reference to FIG. 2, the input data 202 can include multiple sets of data values for sensors $S_1, \ldots, S_n$, the data values corresponding to times $t_1$ to $t_p$. In some examples, a window of data values are selected for processing through the ML component 214. For example, times $t_1$ to $t_m$ can define a window of data values that are processed through the ML component 214. In some examples, m≤p. In the example case of a RNN, the size of the window (e.g., m) can be defined by a size of the neural network. For example, the larger the number of nodes, and layers in the neural network, the larger the window can be. However, larger neural networks require an increased amount of computing power. Consequently, a relatively lower number of nodes, and/or layers can be used to reduce the computing power required. In any case, the value of m, and thus the number of data values processed is a function of the size of the neural network.

In some implementations, data values of one or more sensors at time t can be predicted as a function of data values at other times. The following example relationship can be provided:

$$X_t' = f(X_{t_1}, \ldots, X_{t_m})$$

where $X_t'$ is a vector containing predicted sensor value(s) for time t. In some examples, if $X_t'$ includes predicted data values for all sensors, it is provided as a vector of size n. In some examples, $X_t$ is a vector containing all n observed sensor readings for time t. As described in further detail herein, predicted data values for time t can be compared to observed data values for time t to determine whether an anomaly exists. In some examples, an anomaly score is determined, and is representative of a degree, to which the observed value indicates an anomaly.

In accordance with implementations, of the present disclosure, multiple nonlinear auto-regression models (NAMs) are determined based on the data 206. For each for NAM all of the data 206 is used. However, a portion (sub-set) of the data 206 is provided as input to the ML component 214, and another portion (sub-set) of the data 206 is provided as training data, to which the input is to be compared. In further detail, the ML sub-component 214 (e.g., LSTM RNN) can be used to evolve an internal state nonlinearly combined with the inputs at a given moment in time (e.g., time t). The known values from the time-series are used as targets to be predicted (e.g., in the output layer of the neural network). In this manner, nonlinear inter-sensor dependencies, and the nonlinear evolution of the sensor system over time can be captured.

By way of non-limiting example, the data 206 can be provided as:

TABLE 2

Example Data

| Timestamp | $S_1$ | $S_2$ | $S_3$ | $S_4$ |
|---|---|---|---|---|
| $t_1$ | $X_{1,1}$ | $X_{2,1}$ | $X_{3,1}$ | $X_{4,1}$ |
| $t_2$ | $X_{1,2}$ | $X_{2,2}$ | $X_{3,2}$ | $X_{4,2}$ |
| $t_3$ | $X_{1,3}$ | $X_{2,3}$ | $X_{3,3}$ | $X_{4,3}$ |
| | | . . . | | |
| $t_m$ | $X_{1,m}$ | $X_{2,m}$ | $X_{3,m}$ | $X_{4,m}$ | where n=4. In some implementations, a number k of the n data values can be randomly chosen during training to predict the n−k remaining data values through the ML component 214. That is, a sub-set of the data values can be provided as input to the ML component 214 to perform supervised learning of a NAM using the remaining sub-set of the data values as labeled training data.

In accordance with implementations of the present disclosure, multiple NAMs are trained based on respective input sub-sets of the data values. By way of non-limiting example, and with reference to the example data of Table 2, the following example sub-sets of data can be provided:

TABLE 3

Example Sub-Sets for Model Training

| Input Data | Training Data |
|---|---|
| [$S_1$] | [$S_2$, $S_3$, $S_4$] |
| [$S_3$, $S_4$] | [$S_1$, $S_2$] |
| [$S_4$] | [$S_1$, $S_2$, $S_3$] |

In some examples, the number of input data sub-sets is randomly determined (e.g., but capped by the number of distinct sub-sets possible). In some examples, the number of input data sub-sets is fixed (e.g., three). In some examples, the data used in each data sub-set is randomly selected. In some examples, the data used in each sub-set is predetermined.

In view of the example of Table 3, a first NAM is trained using [$S_1$] as input, and [$S_2$, $S_3$, $S_4$] as training data, a second NAM is trained using [$S_3$, $S_4$] as input, and [$S_1$, $S_2$] as training data, and a third NAM is trained using [$S_4$] as input, and [$S_1$, $S_2$, $S_3$] as training data. Accordingly, the dimensionality between the input and the output can vary for each NAM. For example, on the input side multiple time-series can be used (e.g., three time-series for sensors [$S_2$, $S_3$, $S_4$]). Consequently, at each time step the input includes three-dimensions. The output can be a single dimension (e.g., time-series from sensor [$S_1$]). It is just a matter of having the right dimensions on the weight matrices matching the input dimensions, hidden state dimensions, and output dimensions. For example, a four-dimensional input state, a six-dimensional hidden recurrent state, and a one-dimensional output state can be provided. Consequently, the input weight matrix would be 4×6 in size, which maps the 4-dimensional input to a 6-dimensional output. The recurrent time propagation matrix would be 6×6 in size, and the matrix mapping the hidden state to the output would be 6×1 in size.

Accordingly, implementations of the present disclosure provide multiple NAMs. In some implementations, predicted values for time t are provided from each of the multiple NAMs. That is, a vector $X_t'$ containing predicted sensor value(s) for time t is provided from each NAM. Using the example above, $X_{t,1}'$, $X_{1,2}'$, and $X_{t,3}'$ are provided from the first NAM, the second NAM, and the third NAM, respectively. In some implementations, actual values $X_t$ for observed sensor readings for time t, are compared to the predicted values, and respective anomaly scores are determined. In a non-limiting example, an anomaly score is determined as the root mean squared error (RMSE) of the difference between a predicted data value, and an observed data value. Continuing with the example above, anomaly scores $A_1$, $A_2$, $A_3$ are provided for the first NAM, the second NAM, and the third NAM, respectively.

In some implementations, the anomaly scores aggregated to provide a final anomaly score. In some examples, the anomaly scores are aggregated as a weighted sum of anomaly scores by optimizing the goal of maximal separation of scores (max margin) between anomalies and non-anomalies (high scores and low scores). In some examples, final anomaly score is provided as the ordinary mean, the max, or the min of the anomaly scores. In some examples, the final anomaly score can be compared to a threshold anomaly score. If the final anomaly score exceeds the threshold anomaly score, it can be determined that an anomaly is present, and an alert can be provided.

Figure 3:
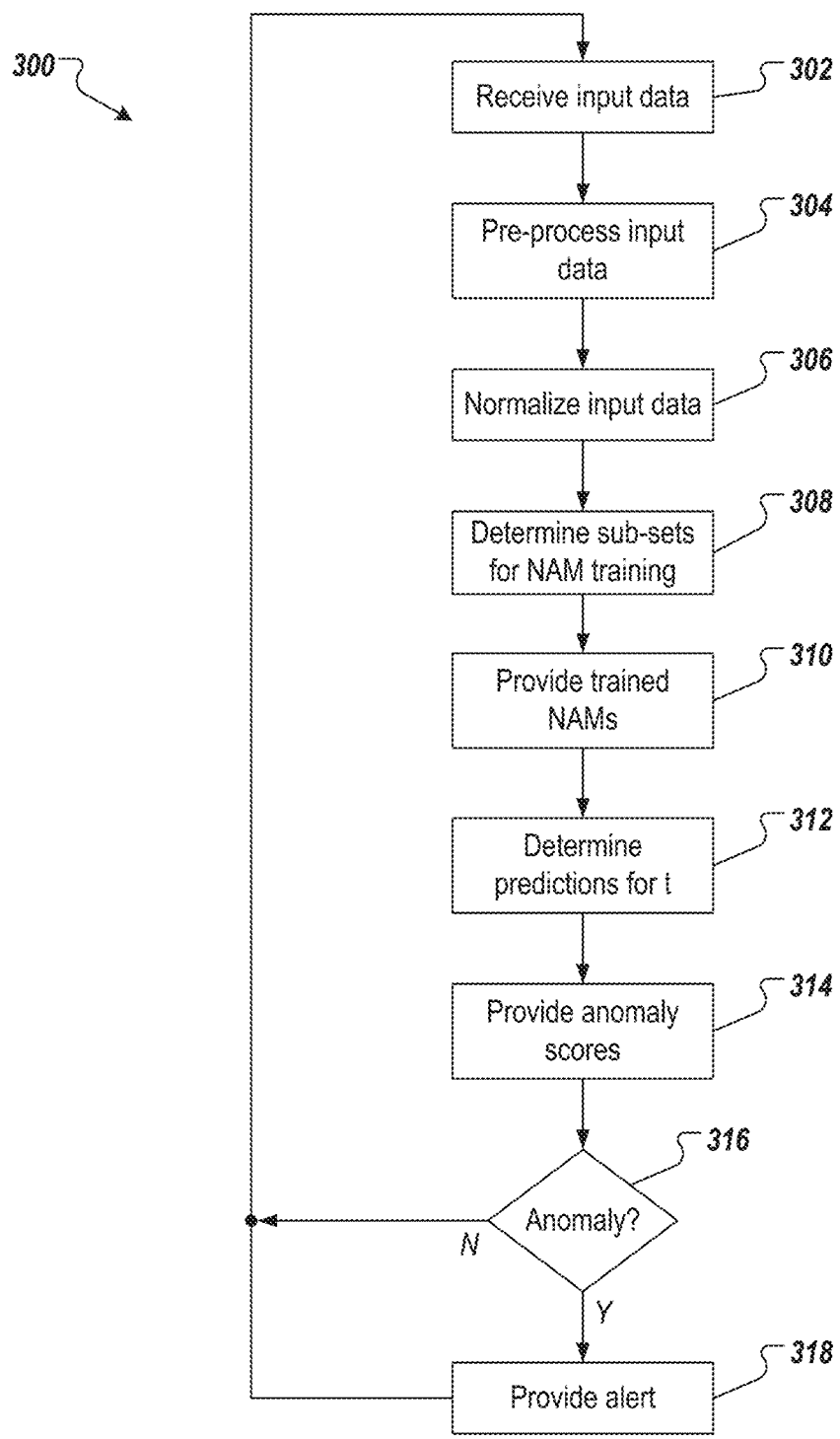
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices (e.g., the server system 108 of FIG. 1).

Input data is received (302). For example, time-series data from multiple sensors of an IoT system is provided as the input data. Example input data is depicted in Table 1, described above. Input data is pre-processed (304). For example, at least a portion of the input data is pre-processed to ensure the data values of the respective time-series data are equidistant in terms of time, as described in detail herein. Input data is normalized (306). For example, at least a portion of the input data is normalized such that all data values of the respective time-series data are within a pre-defined range (e.g., [0, 1], [−1, 1]), as described herein.

Sub-sets of the input data are provided for NAM training (308), and a set of trained NAMs is provided (310). For example, and as described in detail herein, multiple NAMs are determined based on the input data (e.g., pre-processed, normalized). For each NAM, all of the input data is used. However, a portion (sub-set) of the input data is provided as input to the ML component, and another portion (sub-set) of the data is provided as training data, to which the output is to be compared. This process is repeated, as described herein, with different combinations of sub-sets to provide multiple trained NAMs.

Predictions are determined for time t (312). For example, for each NAM, time-series data at time t is processed to provide a respective prediction, as described herein. Anomaly scores are provided (314). For example, and as described herein, actual values $X_t$ for observed sensor readings for time t, are compared to the predicted values, and respective anomaly scores are determined (e.g., as the RMSE of the difference between a predicted data value, and an observed data value).

It is determined whether an anomaly is present (316). For example, and as described herein, the anomaly scores aggregated to provide a final anomaly score that is compared to a threshold anomaly score. If the final anomaly score exceeds the threshold anomaly score, it can be determined that an anomaly is present. If an anomaly is not present, the example process 300 loops back. If an anomaly is present, an alert is provided (318), and the example process 300 loops back.

Figure 4:
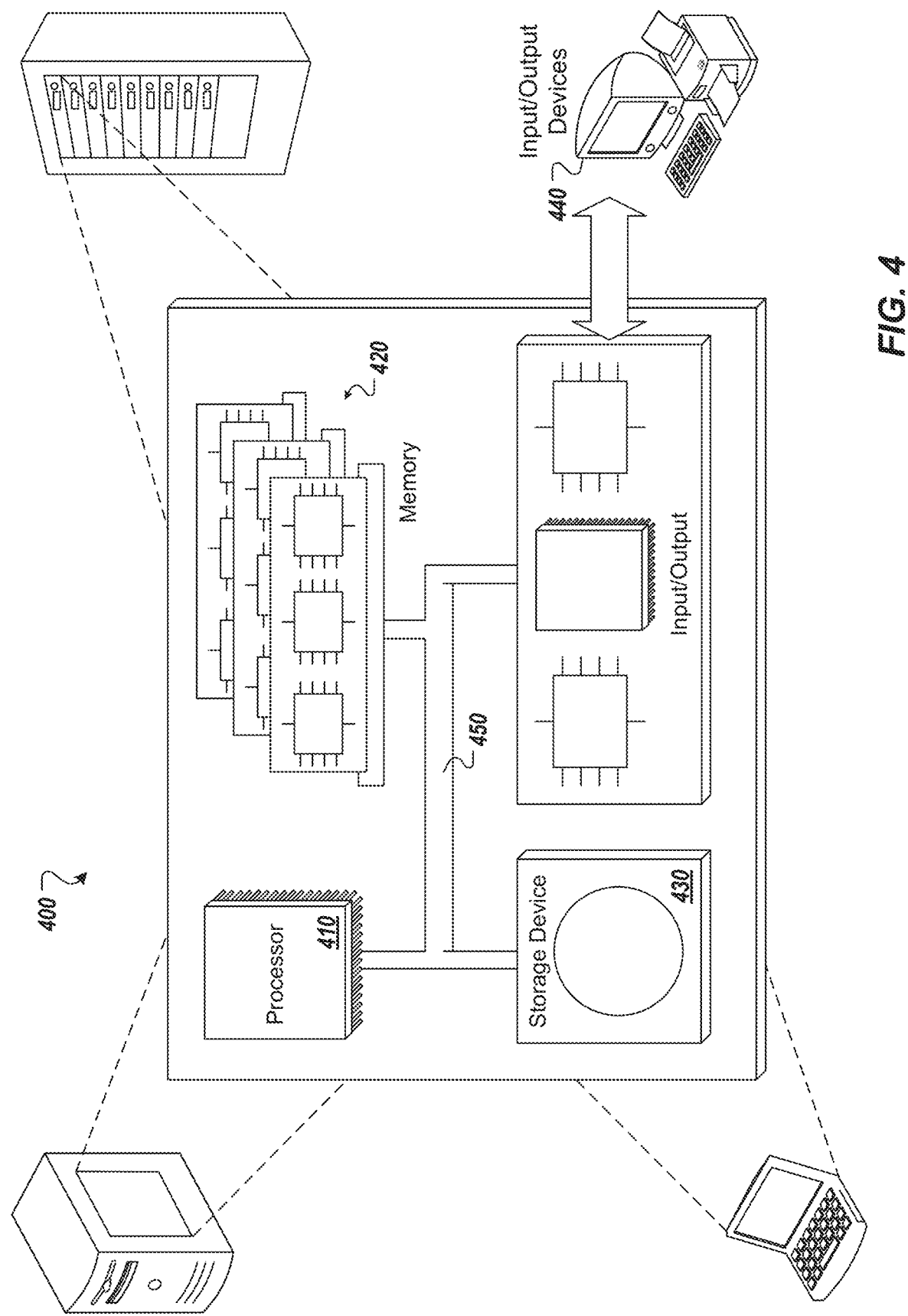
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for detecting anomalies based on time-series sensor data, the method being executed by one or more processors and comprising:
    receiving, by the one or more processors, a time-series of data values associated with a plurality of sensors, each sensor generating at least a portion of the time-series of a respective data value;
    providing, by the one or more processors, a plurality of auto-regression models comprising at least a first auto-regression model and a second auto-regression model, the first auto-regression model being provided based on a first sub-set of the time-series of data values used as input and a second sub-set of the time-series of data values used as training data during a training process, and the second auto-regression model being provided based on a third sub-set of the time-series of data values used as input and a fourth sub-set of the time-series of data values used as training data during a training process, the first sub-set of time-series of data values comprising data values from a first sensor and the fourth sub-set of the time-series of data values comprising the data values from the first sensor;
    receiving, by the one or more processors, respective data values associated with a time from and generated by each of the plurality of sensors;
    determining, by the one or more processors, respective predicted values for each of the auto-regression models; and
    selectively indicating, by the one or more processors, that an anomaly is present in the system based on respective predicted values for each of the auto-regression models, and the respective data values associated with the time.

2. The method of claim 1, wherein each auto-regression model is provided by processing the respective first sub-set of the time-series of data values used as input, and a respective second sub-set of the time-series of data values used as training data through a neural network during the training process.

3. The method of claim 2, wherein the neural network comprises one of a long short-term memory (LSTM), recurrent neural network (RNN), and a gated recurrent unit (GRU) RNN.

4. The method of claim 2, wherein a size of the time-series data used to train each of the plurality of auto-regression models is determined based on a size of the neural network.

5. The method of claim 1, wherein data values of the time-series data are provided from input data that is pre-processed, and normalized.

6. The method of claim 1, wherein selectively indicating that an anomaly is present in the system comprises:
    determining a final anomaly score based on respective predicted values for each of the auto-regression models, and the respective data values associated with a time; and
    indicating that an anomaly is present in response to determining that the final anomaly score exceeds a threshold anomaly score.

7. The method of claim 6, wherein the final anomaly score is determined based on anomaly scores determined for each of the auto-regression models.

8. A non-transitory computer-readable storage medium coupled to one or more processors and having instructions stored thereon which, when executed by the one or more processors, cause the one or more processors to perform operations for detecting anomalies based on time-series sensor data, the operations comprising:

receiving a time-series of data values associated with a plurality of sensors, each sensor generating at least a portion of the time-series of a respective data value;

providing a plurality of auto-regression models comprising at least a first auto-regression model and a second auto-regression model, the first auto-regression model being provided based on a first sub-set of the time-series of data values used as input and a second sub-set of the time-series of data values used as training data during a training process, and the second auto-regression model being provided based on a third sub-set of the time-series of data values used as input and a fourth sub-set of the time-series of data values used as training data during a training process, the first sub-set of time-series of data values comprising data values from a first sensor and the fourth sub-set of the time-series of data values comprising the data values from the first sensor;

receiving respective data values associated with a time from and generated by each of the plurality of sensors;

determining respective predicted values for each of the auto-regression models; and selectively indicating that an anomaly is present in the system based on respective predicted values for each of the auto-regression models, and the respective data values associated with the time.

9. The computer-readable storage medium of claim 8, wherein each auto-regression model is provided by processing the respective first sub-set of the time-series of data values used as input, and a respective second sub-set of the time-series of data values used as training data through a neural network during the training process.

10. The computer-readable storage medium of claim 9, wherein the neural network comprises one of a long short-term memory (LSTM), recurrent neural network (RNN), and a gated recurrent unit (GRU) RNN.

11. The computer-readable storage medium of claim 9, wherein a size of the time-series data used to train each of the plurality of auto-regression models is determined based on a size of the neural network.

12. The computer-readable storage medium of claim 8, wherein data values of the time-series data are provided from input data that is pre-processed, and normalized.

13. The computer-readable storage medium of claim 8, wherein selectively indicating that an anomaly is present in the system comprises:

determining a final anomaly score based on respective predicted values for each of the auto-regression models, and the respective data values associated with a time; and indicating that an anomaly is present in response to determining that the final anomaly score exceeds a threshold anomaly score.

14. The computer-readable storage medium of claim 13, wherein the final anomaly score is determined based on anomaly scores determined for each of the auto-regression models.

15. A system, comprising:
a computing device; and
a computer-readable storage device coupled to the computing device and having instructions stored thereon which, when executed by the computing device, cause the computing device to perform operations for detecting anomalies based on time-series sensor data, the operations comprising:

receiving a time-series of data values associated with a plurality of sensors, each sensor generating at least a portion of the time-series of a respective data value;

providing, by the one or more processors, a plurality of auto-regression models comprising at least a first auto-regression model and a second auto-regression model, the first auto-regression model being provided based on a first sub-set of the time-series of data values used as input and a second sub-set of the time-series of data values used as training data during a training process, and the second auto-regression model being provided based on a third sub-set of the time-series of data values used as input and a fourth sub-set of the time-series of data values used as training data during a training process, the first sub-set of time-series of data values comprising data values from a first sensor and the fourth sub-set of the time-series of data values comprising the data values from the first sensor;

receiving respective data values associated with a time from and generated by each of the plurality of sensors;

determining respective predicted values for each of the auto-regression models; and selectively indicating that an anomaly is present in the system based on respective predicted values for each of the auto-regression models, and the respective data values associated with the time.

16. The system of claim 15, wherein each auto-regression model is provided by processing the respective first sub-set of the time-series of data values used as input, and a respective second sub-set of the time-series of data values used as training data through a neural network during the training process.

17. The system of claim 16, wherein the neural network comprises one of a long short-term memory (LSTM), recurrent neural network (RNN), and a gated recurrent unit (GRU) RNN.

18. The system of claim 16, wherein a size of the time-series data used to train each of the plurality of auto-regression models is determined based on a size of the neural network.

19. The system of claim 15, wherein data values of the time-series data are provided from input data that is pre-processed, and normalized.

20. The system of claim 15, wherein selectively indicating that an anomaly is present in the system comprises:

determining a final anomaly score based on respective predicted values for each of the auto-regression models, and the respective data values associated with a time; and indicating that an anomaly is present in response to determining that the final anomaly score exceeds a threshold anomaly score.

* * * * *